(12) United States Patent
Cheng et al.

(10) Patent No.: US 10,796,094 B1
(45) Date of Patent: *Oct. 6, 2020

(54) EXTRACTING KEYWORDS FROM A DOCUMENT

(71) Applicant: Amazon Technologies, Inc., Seattle, WA (US)

(72) Inventors: Weiwei Cheng, Berlin (DE); Amanda Dee Bottorff, Seattle, WA (US); Sandeep Ranganathan, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,407

(22) Filed: Aug. 7, 2019

Related U.S. Application Data

(63) Continuation of application No. 15/269,539, filed on Sep. 19, 2016, now Pat. No. 10,387,568.

(51) Int. Cl.
*G06F 16/00* (2019.01)
*G06F 40/289* (2020.01)
(Continued)

(52) U.S. Cl.
CPC .......... *G06F 40/289* (2020.01); *G06F 16/248* (2019.01); *G06F 16/2462* (2019.01);
(Continued)

(58) Field of Classification Search
CPC ............. G06F 16/24578; G06F 16/951; G06F 16/2462; G06F 16/248; G06F 17/2775; G06F 17/3053; G06F 40/289; G06F 17/30536; G06F 17/30554; G06F 17/30864; G06F 17/30424; G06F 17/30321;
(Continued)

(56) References Cited

U.S. PATENT DOCUMENTS 5,704,060 A 12/1997 Del Monte
6,473,778 B1 * 10/2002 Gibbon ................. G06F 40/103
715/201

(Continued)

OTHER PUBLICATIONS

Office Action for U.S. Appl. No. 15/1269,539, dated Aug. 23, 2018, Weiwei Chang, "Extracting Keywords From a Document", 25 pages.

(Continued)

*Primary Examiner* — Anh Ly
(74) *Attorney, Agent, or Firm* — Lee & Hayes, P.C.

(57) ABSTRACT

An unsupervised keyword extraction process is disclosed. A single input document can be analyzed to identify multiple candidate keywords by utilizing splitting terms. A keyword score is calculated for each of the candidate keywords. The keyword score for a particular candidate keyword is determined based on the length of the candidate keywords that contain the candidate keyword and the frequency of the words appearing in the candidate keywords. One or more keywords having the highest keyword scores are selected as the extracted keywords. The extracted keywords can be used in applications, such as refining search results, providing suggested search terms, or improving the match rate of a network page at a search engine.

20 Claims, 10 Drawing Sheets

(51) Int. Cl.
  *G06F 16/2457* (2019.01)
  *G06F 16/951* (2019.01)
  *G06F 16/248* (2019.01)
  *G06F 16/2458* (2019.01)
  *G10L 15/26* (2006.01)

(52) U.S. Cl.
  CPC ...... *G06F 16/24578* (2019.01); *G06F 16/951* (2019.01); *G10L 15/26* (2013.01)

(58) Field of Classification Search
  CPC .............. G06F 17/30; G06F 17/30867; G06F 17/30873; G06F 17/30598; G06Q 50/61; G06Q 30/0631; G10L 15/26
  See application file for complete search history.

(56) References Cited

U.S. PATENT DOCUMENTS

| | | | |
|---|---|---|---|
| 8,438,148 B1* | 5/2013 | Rakowski | G06F 3/0482 707/706 |
| 8,438,149 B1 | 5/2013 | Dicker et al. | |
| 8,682,805 B1* | 3/2014 | Hansen | G06Q 10/10 705/319 |
| 8,706,660 B2* | 4/2014 | Bart | G06F 16/93 706/13 |
| 8,868,570 B1 | 10/2014 | Skut et al. | |
| 9,229,924 B2 | 1/2016 | Sun et al. | |
| 9,928,466 B1* | 3/2018 | Sarmento | G06N 7/005 |
| 2005/0065909 A1 | 3/2005 | Musgrove et al. | |
| 2005/0131931 A1 | 6/2005 | Kawajiri | |
| 2007/0244755 A1* | 10/2007 | Do | G06Q 30/0276 705/14.54 |
| 2009/0313245 A1 | 12/2009 | Weyl et al. | |
| 2010/0114561 A1 | 5/2010 | Yasin | |
| 2010/0161655 A1* | 6/2010 | Gil | G06F 16/313 707/769 |
| 2010/0185689 A1 | 7/2010 | Hu et al. | |
| 2010/0325109 A1 | 12/2010 | Bai et al. | |
| 2011/0060747 A1* | 3/2011 | Rose | G06F 16/313 707/750 |
| 2012/0143965 A1* | 6/2012 | Parker | G06Q 10/00 709/206 |
| 2012/0203721 A1* | 8/2012 | Bart | G06F 16/93 706/13 |
| 2012/0239667 A1* | 9/2012 | Vysyaraju | G06F 16/955 707/749 |
| 2013/0138428 A1 | 5/2013 | Chandramouli et al. | |
| 2013/0290138 A1* | 10/2013 | Pan | G06Q 30/0623 705/26.61 |
| 2014/0058722 A1 | 2/2014 | Sun et al. | |
| 2014/0180651 A1* | 6/2014 | Lysak | G16B 40/00 703/2 |
| 2015/0199402 A1 | 7/2015 | Agrawal et al. | |
| 2015/0324342 A1* | 11/2015 | Chin | G06F 16/9535 715/231 |
| 2015/0381556 A1* | 12/2015 | Ahrens | H04W 4/21 707/738 |
| 2016/0239865 A1 | 8/2016 | Song et al. | |
| 2017/0171580 A1 | 6/2017 | Hirsch et al. | |

OTHER PUBLICATIONS

Final Office Action dtd Feb. 1, 2019 for U.S. Appl. No. 15/269,539 "Extracting Keywords From a Document" Cheng, 19 pages.

Office Action for U.S. Appl. No. 15/269,539, dated Aug. 23, 2018, Weiwei Chang, "Extracting Keywords From a Document", 25 pages.

\* cited by examiner

| ITEM | LAPTOP A | LAPTOP B | LAPTOP C | LAPTOP D |
|---|---|---|---|---|
| RATING | 4.2/5 | 4/5 | 3.2/5 | 4.7/5 |
| CUSTOMER REVIEWS SAY | GOOD DISPLAY QUALITY | FAST SHIPPING | CRASH A LOT | LOVE IT |
| PRICE | $249.00 | $250.98 | $219.99 | $319.99 |
| WEIGHT | 4.7# | 4.9# | 4.57# | 5.2# |
| PROCESSOR | 2.16 GHZ | 2.33 GHZ | 1.84 GHZ | 2.67 GHZ |
| RAM | 4 GB | 6 GB | 4 GB | 8 GB |
| STORAGE | 500 GB | 500 GB | 500 GB | 750 GB |

FIG. 6B

EXTRACTING KEYWORDS FROM A DOCUMENT

CROSS-REFERENCE TO RELATED APPLICATION(S)

This application is a continuation of and claims priority to U.S. application Ser. No. 15/269,539, filed on Sep. 19, 2016 and entitled "Extracting Keywords From A Document," the entirety of which is incorporated herein by reference.

BACKGROUND

As the Internet and electronic devices have become ubiquitous, an incredible number of documents are being generated every day, such as blogs, comments, news articles, customer reviews of products, etc. For example, WORDPRESS.COM, owned by AUTOMATTIC INC. of San Francisco, Calif., receives 347 user published blogs every minute and AMAZON.COM, owned by AMAZON.COM INC. of Seattle, Wash., receives on the order of three-hundred thousand customer reviews of products every day. Many of these documents contain useful information. For example, news articles keep readers informed of the events occurring around the world. Similarly, customer reviews of products are not only helpful for customers to make purchase decisions, but also helpful for stakeholders such as authors, sellers, product managers, manufacturers in order to analyze and improve the products.

A very large number of documents can, however, be technically challenging to analyze. A common way to tackle this problem is through keyword extraction. Keywords are significant expressions in a document. Extraction of keywords allows a reader of a document to quickly determine the relevance of the document without reading its entire content.

Extracting meaningful and representative keywords is a nontrivial computing task. As the relevance of a keyword cannot be quantitatively defined, substantial background knowledge is often needed to extract a highly relevant set of keywords. Often times, supervised machine learning through annotating the documents is employed in order to achieve accurate keyword extraction. Corpus level statistics can also be utilized to facilitate keyword extraction. Despite these various efforts, however, existing keyword extraction approaches still do not provide satisfactory results.

The disclosure made herein is presented with respect to these and other considerations.

BRIEF DESCRIPTION OF THE DRAWINGS

FIGS. 6A and 6B are screen diagrams showing an exemplary user interface for utilizing keywords extracted from product reviews to filter search results of products and to display a comparison table, respectively, according to one configuration disclosed herein;

DETAILED DESCRIPTION

Figure 1:
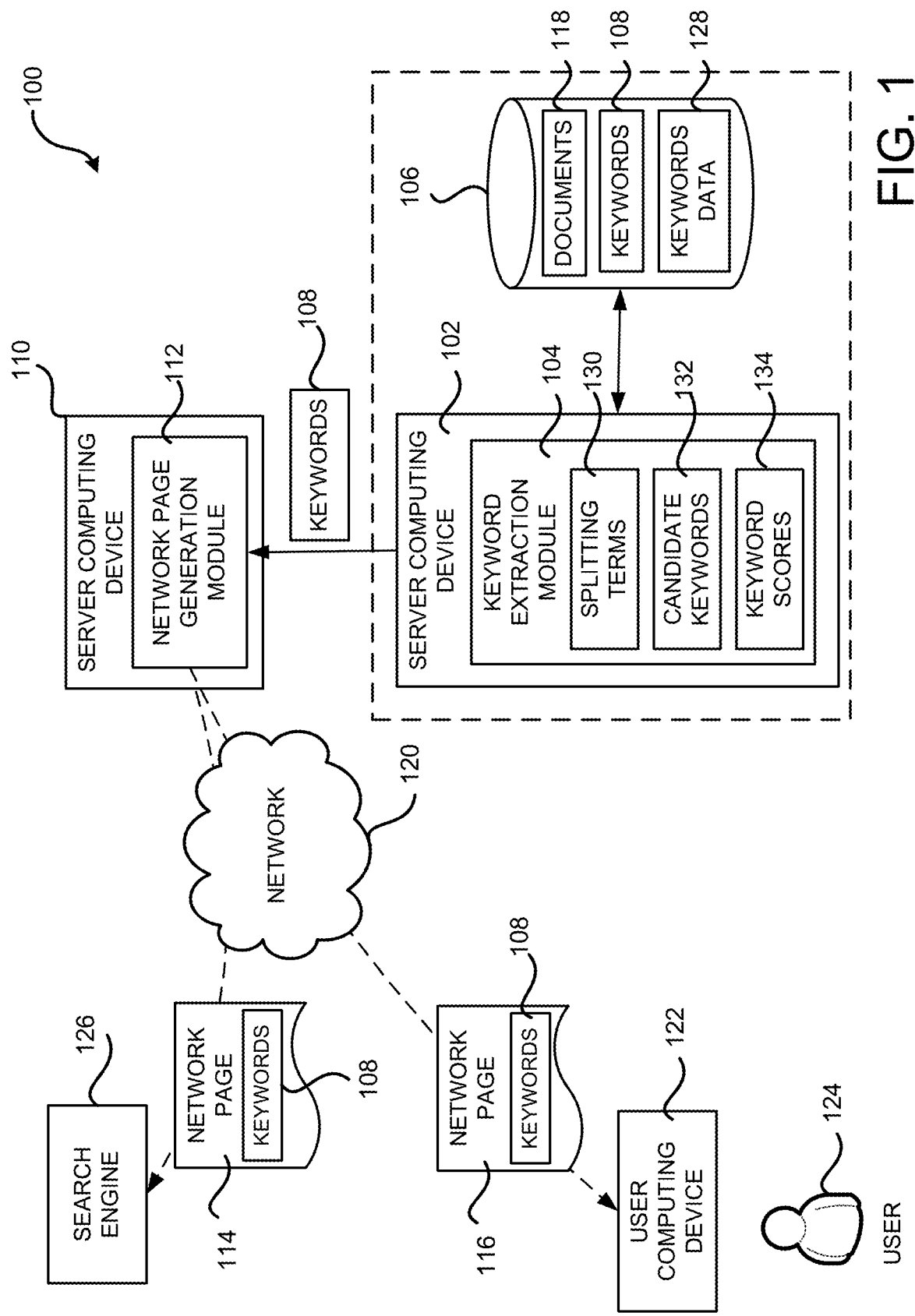
FIG. 1 is a system architecture diagram showing aspects of an illustrative operating environment for the technologies disclosed herein for extracting keywords from a document, according to one configuration disclosed herein.

The following detailed description is directed to technologies for extracting keywords from a document. Through an implementation of the disclosed technologies, one or more keywords representing the content of a document can be automatically extracted from the document through an unsupervised process, i.e. without any human intervention, such as annotating, which is commonly used in supervised learning. The keyword extraction process is domain independent in that the process applies to any document regardless of its content. Moreover, the keyword extraction technology presented herein can be applied to a single document without performing a corpus level statistical analysis. This can significantly increase the speed of keyword extraction while using less computing and storage resources, such as central processing unit ("CPU") time and memory space.

Compared with existing keyword extraction approaches where only a unigram keyword is extracted, the keyword extraction mechanism presented herein also allows more flexible keyword extraction in terms of the length of the extracted keywords. Further, since the keyword extraction mechanism presented herein works on a single document, keywords can be extracted and updated as new documents are generated without repeating the extraction process for the entire collection of documents, thereby increasing the overall speed of keyword extraction. This also saves CPU and memory utilization. Additional technical benefits other than those described briefly above can also be realized through an implementation of the technologies disclosed herein.

In order to enable the functionality disclosed herein, a keyword extraction module is provided that is capable of extracting one or more keywords from a document. A keyword can be a unigram, i.e. consisting of a single word, or a multi-gram, i.e. consisting of multiple words. In a broader sense, a keyword can also include any string that consists of a sequence of characters, which may or may not have literal or practical meaning. For example, keywords can be extracted from a tokenized document and the extracted keywords can contain strings that do not have semantic or pragmatic content on its face. As such, the term "keyword" and "key string" are used interchangeable in the following. Similarly, the terms "word" or "phrase" can also be used to refer to any sequence of characters.

The keyword extraction module can generate a set of candidate keywords. The candidate keywords can be generated by utilizing splitting terms. Words or phrases located between two adjacent splitting terms in the document can be extracted as a candidate keyword. For each of the extracted candidate keywords, the keyword extraction module calculates a keyword score. In one implementation, the keyword score for a candidate keyword is generated as a sum of word scores of the words contained in the candidate keyword.

To determine the word score for a word, candidate keywords that contain the word are identified and a total span or a total length of these candidate keywords is measured. The span or the length of a candidate keyword can be measured as the number of words contained in the candidate keyword. In addition, a frequency (i.e. the number of times) of the word appearing in these candidate keywords is also measured. The word score for a word contained in a candidate keyword can be determined to be proportional to the span of the candidate keywords and inversely proportional to the frequency of the word. Once the keyword scores for the candidate keywords are calculated, the keyword extraction module can select one or more keywords from these candidate keywords based on the keyword scores. For example, the keyword extraction module can select keywords having keyword scores higher than a predetermined score threshold. The keyword extraction module can also select the keywords as those candidate keywords having the highest keyword scores.

The selected keywords for the document can be used in various ways. For example, if the document is a customer review of a product, the keywords can be included in the description of the product presented in a product detail web page and/or be utilized as a feature for comparing different products. The keywords can also be utilized to refine a search result by allowing a user to filter the search results using the keywords or be provided to a user as suggested search terms. In addition, the keywords can also be included in a network page as search tags that are searchable by a search engine, thereby improving the search engine optimization. Additional details regarding the various aspects described briefly above will be provided below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can also be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing an overview of the configuration and operation of an operating environment 100 presented herein that is configured for executing components for extracting keywords from a document, according to one particular configuration. As shown in FIG. 1, a keyword extraction module 104 can execute on a server computing device 102. The server computing device 102 can represent one or more server computers, Web servers, database servers, or network appliances. Alternatively, the server computing device 102 can represent a user computing device, such as a PC, a desktop workstation, a laptop, a notebook, a mobile device, a PDA, and the like. It will be appreciated that the server computing device 102 may represent any type of server computer or user computing device known in the art.

The server computing device 102 can execute a number of modules in order to implement the keyword extraction module 104. The modules can execute on a server computing device 102 or in parallel across multiple server computing devices 102. In addition, each module may consist of a number of subcomponents executing on different server computing devices 102. The modules may be implemented as hardware or software executed by hardware.

As briefly discussed above, the keyword extraction module 104 can extract keywords from a document 118. The document 118 can be retrieved from a data store 106 configured to store various documents 118, such as a database or other storage mechanism available to the server computing device 102. The document 118 can also be generated and sent to the keyword extraction module 104 by other systems in the operating environment 100 or other modules of the server computing device 102.

It should be noted that the keywords extraction presented herein is domain independent, which means that the keyword extraction can work on any type of document, regardless of the content of the document 118. For example, the document 118 can be a review article submitted by a consumer of a product, a blog posted by a user, or a news article reporting an event occurred in certain area.

For a given document 118, the keyword extraction module 104 obtains a list of splitting terms 130. The splitting terms 130 can be utilized to determine candidate keywords 132 from the documents as words or phrases located between two adjacent splitting terms 130. The splitting terms 130 can include function words, punctuations, or formatting. Generally, a function word, which might also be referred to herein as a "stop word," can be a word that does not contain semantic information. Examples of function words include, but are not limited to, "a," "an," "the," "and," "of," "is," "with," "on," and the like.

It should be understood that the list of function words used in the keyword extraction can be expanded or shortened depending on the document and/or the goal of the keyword extraction. For example, if a keyword "United States of America" is expected to be extracted from the document, the word "of" can be removed from the function word list. Likewise, if a user of the keyword extraction module 104 prefers that the extracted keywords not include describing words, such as "good," "terrific," or "terrible," these describing words can be included as function words so that they do not appear in the extracted keywords. In other words, the function words can include those words that are not a keyword by itself. Similar to the function words, punctuation, such as commas, quotation marks, colons, periods, ellipsis, and formatting, such as a tab or line break, can also be used to identify candidate keywords 132, and thus be included as the splitting terms 130.

The splitting terms 130 can be obtained by the keyword extraction module 104 by accessing a pre-determined list of splitting terms 130. Alternatively, or additionally, the keyword extraction module 104 or other modules can perform corpus level analysis to identify splitting terms 130 for keyword extraction. For instance, the keyword extraction module 104 or another module can access a collection of documents, such as the entire set of customer reviews of a certain type of products, and calculate statistics, such as term frequency-inverse document frequency ("TF-IDF") to determine the importance of a word in the collection of document. Those words that are less important or that appear often in the collection of documents can be used as function words for the keyword extraction. Furthermore, the splitting terms 130 can be refined based on the extracted keywords. If, for example, a certain word in a set of extracted keywords is determined to be unnecessary, this word can be added to the splitting terms 130 as a function word for the next round of keyword extraction.

Once the splitting terms 130 are determined or obtained, the keyword extraction module 104 can extract candidate keywords 132 from the document 118. The candidate keywords 132 are extracted as the word or phrases located between two adjacent splitting terms 130. For example, with the splitting terms 130 listed above, the sentence "Here is a good basic military-dive-style watch with features including readable numbers on the face and seconds printed on a rotating bezel, and water-resistant to 100 m," can have candidate keywords 132 such as "good basic military-dive-style watch," "features including readable numbers," "face," "seconds printed," "rotating bezel," "water-resistant," and "100 m." As can be seen from this example, the candidate keywords 132, and the ultimately extracted keywords, are not restricted to be a unigram. The keywords can in fact be of any length, i.e. containing any number of words. This provides a better keyword extraction result because a keyword containing multiple words generally can convey more and better information than a single word keyword.

For each candidate keyword, the keyword extraction module 104 can calculate a keyword score 134 to measure its importance to the document. In one configuration, the keyword score 134 of a candidate keyword 132 can be determined based on the importance of the words contained in the candidate keyword, measured by a word score. The keyword score 134 can be calculated as the sum of the word scores of the words contained in the candidate keyword 132. Additional details regarding the calculation of the keyword score 134 and the word score will be presented below with regard to FIGS. 3 and 4.

Based on the keyword scores 134, the keyword extraction module 104 can determine extracted keywords 108 (also referred to as "a keyword 108" or "keywords 108") for the document. In one implementation, the extracted keywords 108 can include those candidate keywords 132 whose keyword scores 134 are higher than a pre-determined score threshold. In another implementation, the extracted keywords 108 can include the candidate keywords 132 whose keyword scores 134 are among the N highest scores, where N is a pre-determined number. Various other ways of determining the extracted keyword 108 from the candidate keywords 132 can also be employed.

The extracted keywords 108 can be stored in the data store 106 along with the document 118 or at other locations. In addition to the extracted keywords 108, the keyword extraction module 104 can also save, along with the keywords 108, keyword data 128 that are associated with the extracted keywords 108. For example, the keyword data 128 can include data identifying the document from which the keywords 108 are extracted, the keyword scores 134 of the keywords 108, the splitting terms 130 used in extracting the keywords 108, and others.

As can be seen from the above description, the keyword extraction described herein can be performed on a single document without analysis at the corpus level. As used here, a corpus refers to a collection of documents that are related in a certain aspect. For example, a corpus can be a collection of customer reviews of products, a collections of news articles or a collection of blog posts. Since the keyword extraction presented herein does not involve computation at the corpus level, the computation complexity can be significant reduced, leading to less CPU consumption and memory usage. Meanwhile, the speed of keyword extraction can be increased because only a single document needs to be processed. In addition, the keyword extraction is an unsupervised process and does not require any annotation on the document to facilitate the keyword extraction. The unsupervised mechanism also increases the speed of keyword extraction by eliminating the annotation process, which is time-consuming.

It should also be noted that the keyword extraction mechanism presented herein is domain independent or content independent. In other words, the disclosed mechanisms can be applied to documents having any type of content. Furthermore, the disclosed keyword extraction mechanism can also be adapted to be applicable to different languages by utilizing splitting terms 130 that are directed to a specific language, including the function words, punctuation and formatting.

The extracted keywords 108 can be used in various scenarios. For example, the extracted keywords 108 can be incorporated into a network page 116 that can be delivered from one computing device to another computing device over a network 120, such as a web page written in HyperText Markup Language ("HTML") or other markup language. The keyword extraction module 104 can send the extracted keywords 108 to a network page generation module 112 executing on a service computing device 110 to incorporate the extracted keywords 108 into the network page 116. For example, the extracted keywords 108 can be utilized to improve search engine optimization for a network page 114 related to the content of the document 118. This can be achieved by adding the keywords 108 to the network page 114 as search tags that are searchable by a search engine 126 so as to increase the match rate of the network page 114 at the search engine 126.

Furthermore, if the document 108 from which the keywords are extracted is a news article, the extracted keywords 108 can be added to a web page 116 presenting the news article to a user computing device 122 to help readers 124 quickly identify the content of the article. Similarly, if the document 108 is a customer review of a certain product, the extracted keywords 108 can be included in a network page 116 describing details of the particular product presented to a customer 124 on a user computing device 122. Additional details regarding utilizing keywords extracted from customer reviews of products are discussed below with regard to FIG. 2.

Figure 2:
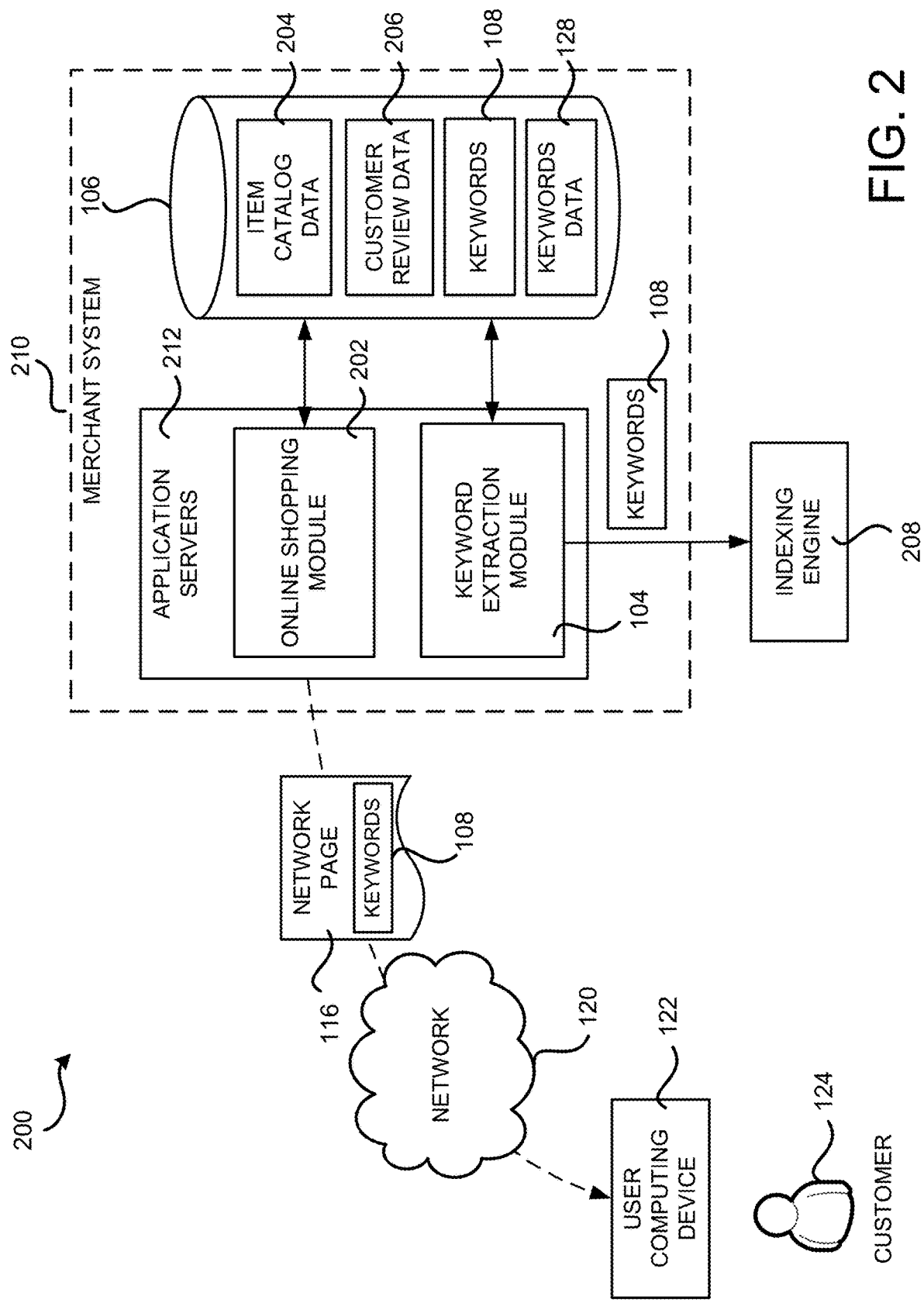
FIG. 2 is a system architecture diagram showing aspects of an illustrative operating environment for the technologies disclosed herein for extracting keywords from a product review and incorporating the keywords into network pages generated by a merchant system, according to one configuration disclosed herein.

FIG. 2 is a system architecture diagram showing an illustrative operating environment 200 for the technologies disclosed herein for extracting keywords from a customer review of a product and incorporating the keywords into network pages 116 generated by a merchant system, according to one configuration disclosed herein. The environment 200 includes a customer 124 that uses a user computing device 122 to access a merchant system 210 across a network 120. The customer 124 may be an individual or entity that desires to browse, research, review, and/or purchase items offered for sale by the online merchant. Items may include physical goods, such as a blender, a camera, or a CD; digital media products, such as a downloadable MP3 audio track or a streaming movie; event tickets; media or service subscriptions; or any other goods or services which can be purchased by the customer 102 and/or reviewed by customers or other users of the merchant system 210.

The user computing device 122 can be a personal computer ("PC"), a desktop workstation, a laptop, a notebook, a personal digital assistant ("PDA"), an electronic-book reader, a smartphone, a wearable computing device (such as a smart watch, a smart glass, a virtual reality head-mounted display), a game console, a set-top box, a consumer electronics device, a server computer, or any other computing device capable of connecting to the network 120 and communicating with the merchant system 210. The network 120 may be a local-area network ("LAN"), a wide-area network ("WAN"), the Internet, or any other networking topology known in the art that connects the user computing device 122 to the merchant system 210.

The merchant system 210 can include a number of application servers 212 that provide various online shopping services to the user computing device 122 over the network 120. The customer 124 may use a client application executing on the user computing device 122 to access and utilize the online shopping services provided by the application servers 212. According to one embodiment, the client application may be a web browser application, such as the MOZILLA® FIREFOX® web browser from Mozilla Foundation of Mountain View, Calif. The web browser application exchanges data with the application servers 212 in the merchant system 210 using the hypertext transfer protocol ("HTTP") over the network 120. Alternatively, the client application may utilize any number of communication methods known in the art to communicate with the merchant system 210 and/or the application servers 212 across the network 120, including remote procedure calls, SOAP-based web services, remote file access, proprietary client-server architectures, and the like.

The application servers 212 may execute a number of modules in order to provide the online shopping services to the user computing device 122. The modules may execute on a single application server 212 or in parallel across multiple application servers in the merchant system 210. In addition, each module may consist of a number of subcomponents executing on different application servers 212 or other computing devices in the merchant system 210. The modules may be implemented as software, hardware, or any combination of the two.

According to one aspect, an online shopping module 202 executes on the application servers 212. The online shopping module 202 can retrieve information regarding a particular item offered for sale by the online merchant from item catalog data 204, generate item details containing the item information, and transmit the item details over the network 120 to the client application for presentation to the customer 124. The item catalog data 204 can be stored in a data store 106, such as a database or other storage mechanism available to the application servers 212 in the merchant system 210. The item catalog data 126 can contain information regarding each item offered for sale by the merchant.

Customers of the online merchant can provide customer reviews for items offered for sale through the merchant system 210. The customer reviews can be provided by customers 124 utilizing a review function of the online shopping module 202, for example. The customer reviews can include any free-form text comments in any format regarding items of any type, including physical products, digital media, services, and the like. In addition, the customer reviews can further include feedback or discussions regarding the customer reviews, comments made regarding other subjects related to the item or collection of items, and/or the like. The customer reviews can be stored in customer review data 206 in the data store 106 or other storage mechanism in the merchant system 210.

According to one configuration, a keyword extraction module 104 executes on the application servers 212. The keyword extraction module 104 can access the customer reviews in the customer review data 206 in order to extract keywords that summarize the information contained in the customer reviews for the items. The extracted keywords 108 may be stored in the data store 106 or other storage mechanism in the merchant system 210. The online shopping module 202 can retrieve the extracted keywords 108 for a particular item and include the extracted keywords 108 in the network pages 116 sent to the customer 124.

For example, the network page 116 can be an item detail page containing information about an item, such as the name, model, price, and specifications of an item. The online shopping module 202 can further include the keywords 108 extracted from customer reviews of the item in the item detail page. It should be noted that generally the item information presented in an item detail page is provided by a seller or a manufacturer of the item, and does not provide information from the perspective of a consumer of the item. By including the keywords 108 from customer reviews into the item detail page, a customer 124 can have a quick overview of how other customers feel about an item which facilitate his/her buying decision. Likewise, the keywords 108 can also be used as a feature for the customer 124 to compare items, such as through a comparison table where a customer 124 selects and compares multiple items with regard to various features of the items. Additional details regarding incorporating extracted keywords 108 in an item comparison table is discussed below with regard to FIG. 6B. Additionally, or alternatively, the extracted keywords 108 from customer reviews of the item can also be included in the item detail page 116 as search tags to increase the match rate of the item detail page at the search engine 126 as discussed above.

The extracted keywords 108 can also be included in a search network page 116. The online shopping module 212 can offer a search function allowing customers 124 to search items by typing in a search query in the search network page 116. The extracted keywords 108 can be included in the search network page 116 as a hint or a suggestion for search terms provided to customers 124 when they input the search terms. For example, when a customer 124 inputs a search query "tablet," the online shopping module 212 can utilize the keywords 108 extracted from the customer reviews of tablet products to provide suggestions in the search network page 116 to help the customer 124 complete the search terms, such as "good for kid," or "good display." Similarly, the extracted keywords 108 can also be incorporated in a network page 116 presenting the search results. The extracted keywords 108 can be included in the search result network page 116 as an option to further refine or filter the search results. Additional details regarding incorporating extracted keywords 108 in a search result page 116 is discussed below with regard to FIG. 6A.

The extracted keywords 108 can also be sent to an indexing engine 208 to be used as an index for item search. Indexing the extracted keywords 108 from reviews can improve the search coverage and make the search results customer-oriented, instead of product-oriented. Furthermore, the extracted keywords 108 can also be utilized in personalized recommendations to recommend items to potential buyers. Personalized recommendations are generally made by utilizing the item description provided by sellers or manufacturers of the items, such as the item catalog data 204, and shopping history and browsing history of a consumer. Keywords extracted from customer reviews can provide information that is not included in the item description, but is useful in helping customer making purchase decision. For example, keywords such as "good for kids" or "nice display quality," which are not included in an item description, can be valuable to customers who are shopping for kids and expect good display quality.

It should be appreciated that while FIG. 2 primarily discloses the extraction and use of keywords in the context of customer reviews of items in a merchant system environment, the same concept can be applied to other environments, such as a news website or a blog website. The mechanisms described herein, therefore, should not be read as being limited to a merchant system and customer reviews of items.

Figure 3:
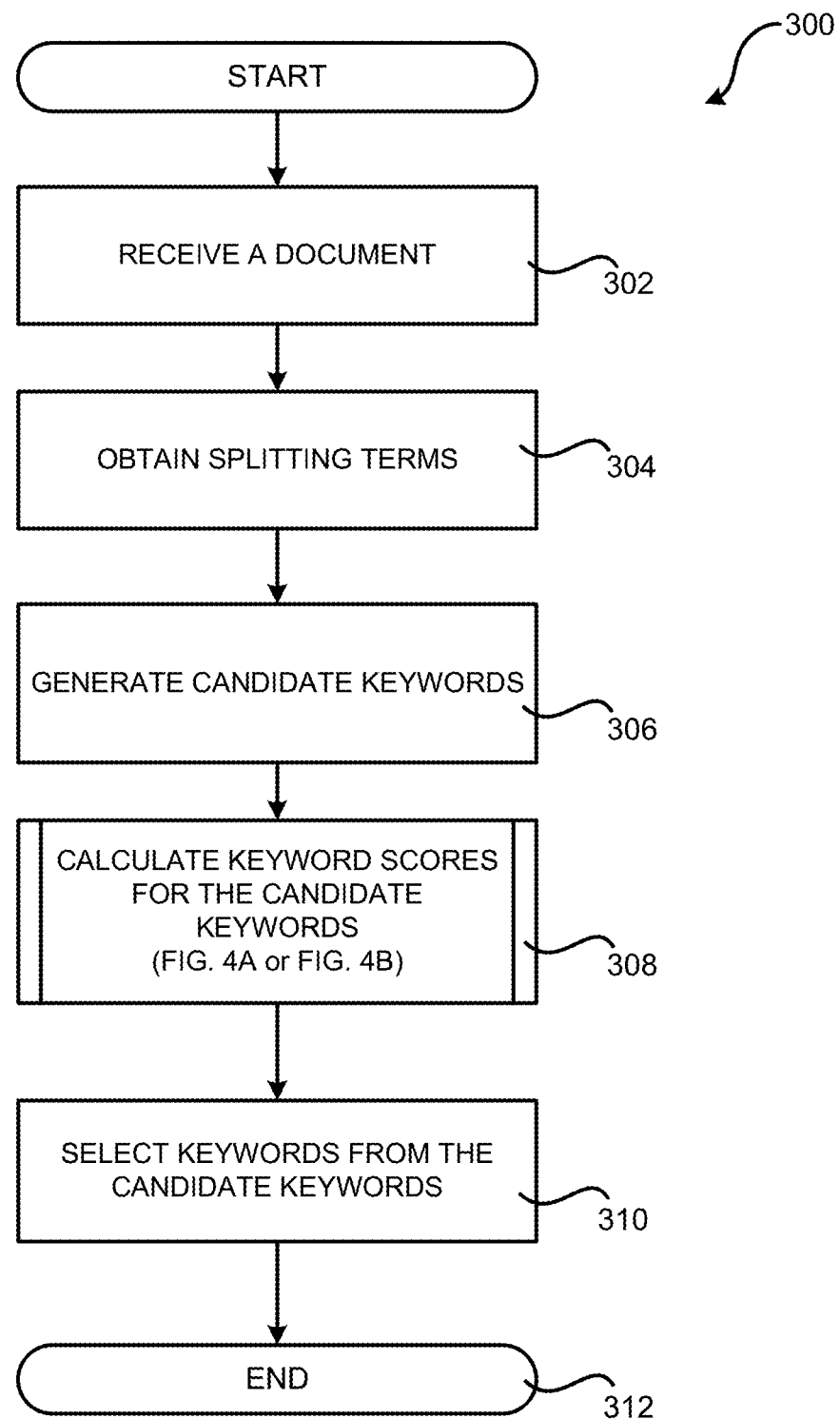
FIG. 3 is a flow diagram showing a routine that illustrates a method of extracting keywords from a document, according to one particular configuration disclosed herein.

FIG. 3 is a flow diagram showing a routine 300 that illustrates a method of extracting keywords from a document, according to one particular configuration disclosed herein. It should be appreciated that the logical operations described herein with respect to FIG. 3, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 300 begins at operation 302, where the keyword extraction module 104 receives or otherwise obtains a document 118 for keyword extraction. The routine 300 then proceeds to operation 304, where the keyword extraction module 104 obtains splitting terms 130 used to generate candidate keywords 132. As discussed above, the splitting terms 130 can include function words that do not contain semantic information. In a broader sense, the function words can include any word that, by itself, is not a keyword. The splitting terms 130 can further include punctuation, such as commas, quotation marks, colons, periods, ellipsis, and formatting, such as a tab or line break.

It should be appreciated that different languages might require different splitting terms 130. The splitting terms 130 thus should be selected for the language contained in the document. Accordingly, when the language of the document 118 is unknown, the routine 300 can include an operation to determine the language of the document before obtaining the splitting terms 130. The splitting terms 130 can be obtained by accessing a pre-determined list of splitting terms 130. Alternatively, or additionally, the splitting terms 130, especially the function words, can be automatically generated by analyzing a collection of documents, and/or dynamically improved based on previous keyword extraction results.

The routine 300 then proceeds from operation 304 to operation 306, where candidate keywords 132 are generated. The candidate keywords 132 can be extracted as the words or phrases located between two adjacent splitting terms 130. In this way, the keyword extraction mechanism presented herein provides the flexibility in terms of the length of the keywords, which can lead to a better keyword extraction result because a keyword containing multiple words generally can convey more and better information than a single word keyword.

From operation 306, the routine 300 proceeds to operation 308, where a keyword score 134 is calculated for each of the generated candidate keywords 132 to measure the importance of the corresponding candidate keyword 132 to the document. Additional details regarding the calculation of the keyword score 134 will be provided below with regard to FIGS. 4A and 4B.

From operation 308, the routine 300 proceeds to operation 310, where the keyword extraction module 104 selects, from the candidate keywords 132, one or more keywords as the extracted keywords 108 based on the keyword scores 134. For example, the extracted keywords 108 can include those candidate keywords 132 whose keyword scores 134 are higher than a pre-determined score threshold. Alternatively, the extracted keywords 108 can include the candidate keywords 132 whose keyword scores 134 are among the N highest scores, where N is a pre-determined number. Various other ways of determining the extracted keywords 108 from the candidate keywords 132 can also be employed. The routine 300 then proceeds from operation 310 to operation 312, where it ends.

Figure 4A:
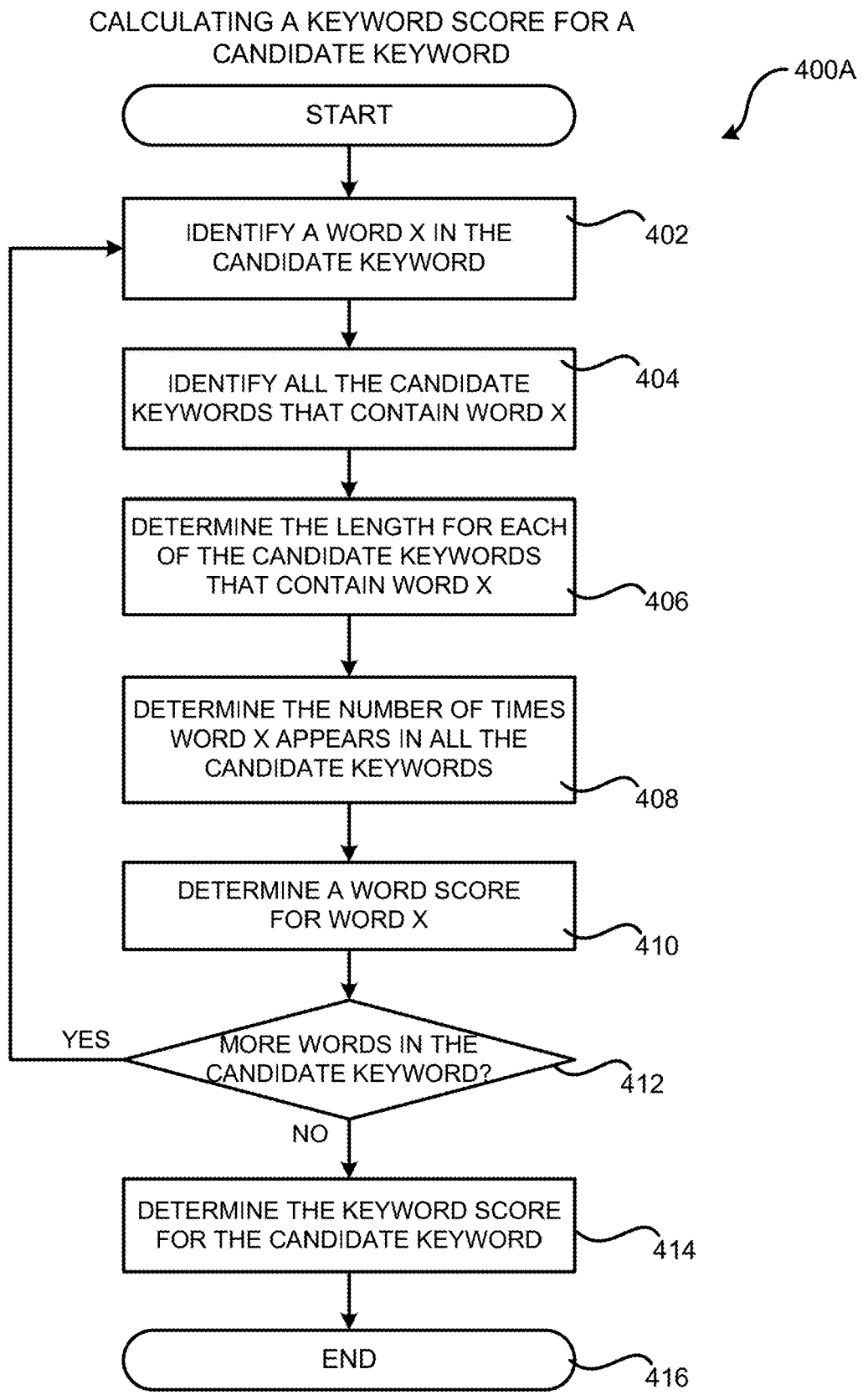
FIGS. 4A and 4B are flow diagrams each showing a routine that illustrates a method of calculating keyword scores for candidate keywords, according to configurations disclosed herein.

FIG. 4A is a flow diagram showing a routine 400A that illustrates aspects of a method of calculating a keyword score 134 for a given candidate keyword 132, according to one configuration disclosed herein. The routine 400A begins at operation 402, where a word x is identified from a given candidate keyword 132. The routine 400A then proceeds to operation 404, where the keyword extraction module 104 identifies all the candidate keywords 132 that contain the identified word x. The routine 400A then proceeds from operation 404 to operation 406, where a length or a span of each of the identified candidate keywords 132 are measured. In one implementation, the length or the span of a keyword is measured by the number of words contained in the keyword.

From operation 406, the routine 400A proceeds to operation 408, where a frequency $f_x$ of the identified word x appearing in the above identified candidate keywords 132 is measured. The frequency can be measured as the number of times the word x appears in the identified candidate keywords 132.

From operation 408, the routine 400A proceeds to operation 410, where a word score is calculated for the word x. In one implementation, the word score $WS_x$ of the word x can be calculated as $$WS_x = \frac{\sum \text{length(candidate keyword containing word } x)}{f_x}. \quad (1)$$

Intuitively, the total length of the candidate keywords 132 containing word x prefers words appearing often and appearing in long candidate keywords 132, and frequency of x, $f_x$, prefers words appearing often in the candidate keywords 132. In this way, the keyword extraction mechanism presented herein promotes the words that primarily appear in long candidate keywords 132, which typically contain more useful information.

From operation 410, the routine 400A proceeds to operation 412, where a determination is made as to whether the given candidate keyword 132 contains more words. If so, the routine 400A returns to operation 402, where another word contained in the candidate keyword 132 is identified. The routine 400A then repeats operations 402-410 until all the words contained in the candidate keyword 132 have been processed.

The routine 400A then proceeds to operation 414, where a keyword score KS for the given candidate keyword 132 is calculated. In one implementation, the keyword score KS is calculated as $KS = \sum_{i \in keyword} WS_i$, where the summation runs through every word contained in the given candidate keyword 132. The keyword score 134 can also be calculated as a weighted sum of the word scores for the words contained in the candidate keyword 132 and the weight for each word score can be utilized to reflect the importance of the corresponding word. From operation 414, the routine 400A proceeds to operation 416, where it ends.

Table 1 shows an example for calculating a keyword score 134 for a candidate keyword "good basic watch." For the example shown in Table 1, assume the candidate keywords 132 extracted from a customer review document are {"good basic watch," "dive watch," "highly recommended," "good quality"}.

TABLE 1

| Word x | Candidate keywords containing word x (length of the candidate keyword) | Frequency of word x appearing in the candidate keywords | Word score $WS_x$ for word x |
|---|---|---|---|
| Good | "good basic watch" (3) "good quality" (2) | 2 | (3 + 2)/2 = 2.5 |
| Basic | "good basic watch" (3) | 1 | 3/1 = 3 |
| Watch | "good basic watch" (3) "dive watch" (2) | 2 | (3 + 2)/2 = 2.5 |
| | Keyword score KS for the candidate keyword "good basic watch" = word score for "good" + word score for "basic" + word score for "watch" | | 2.5 + 3 + 2.5 = 8 |

Figure 4B:
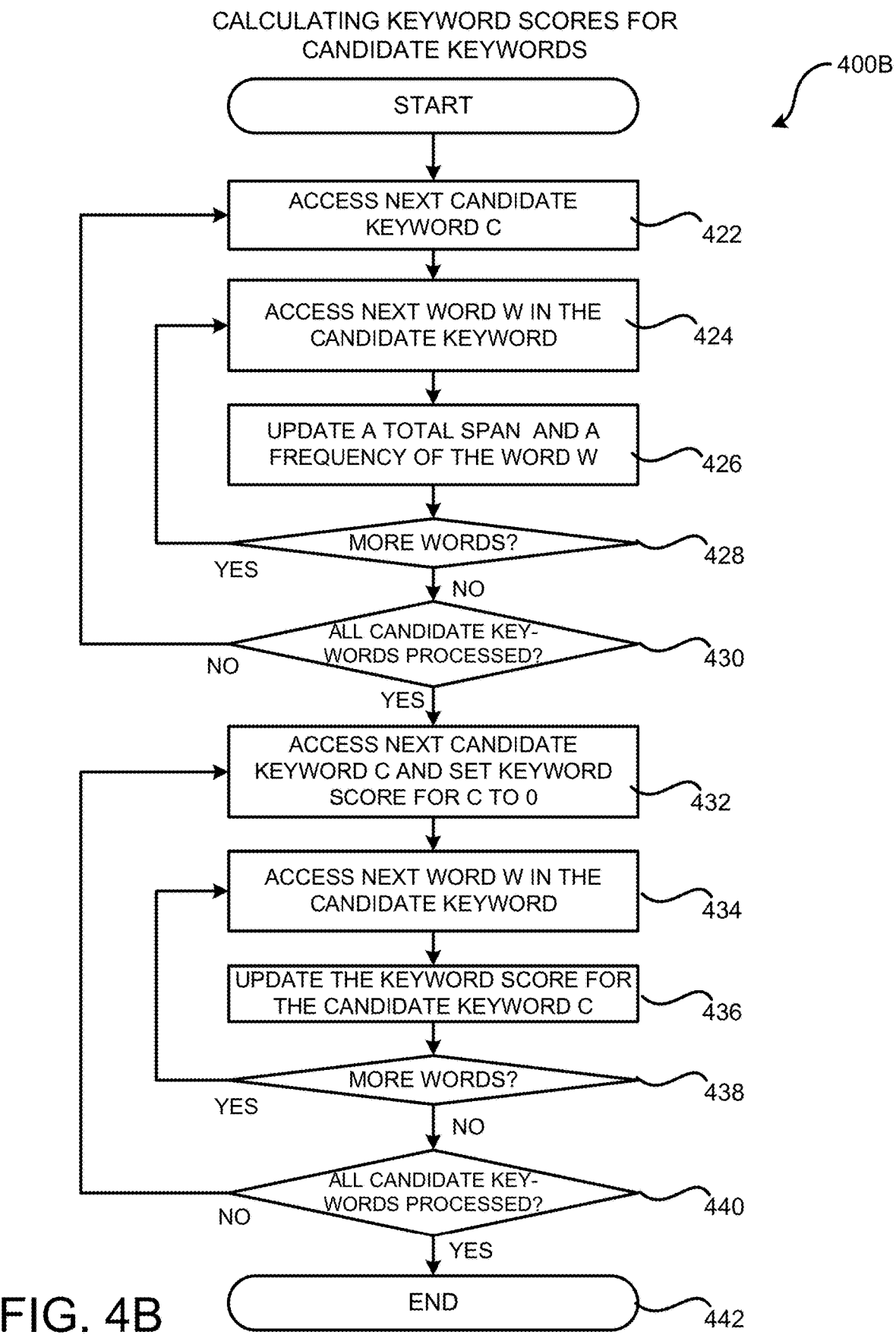

FIG. 4B a flow diagram showing a routine 400B that illustrates aspects of an alternative method of calculating keyword scores 134 for a set of candidate keywords 132, according to another configuration disclosed herein. The routine 400B starts at operation 422, where a candidate keyword c is accessed. The routine 400B then proceeds to operation 424, where a word w in the candidate keyword c is accessed. The routine 400B then proceeds to operation 426, where a total span span(w) and a frequency freq(w) of the word w are updated. Here, the total span of the word w, span(w), can be defined as the total length of the candidate keywords that contain word w. The frequency of the word w, freq(w), can be defined as the total number of times the word w appearing in the set of candidate keywords. If the span(w) and the freq(w) are not defined before, they can be set to each have an initial value of 0. In the operation 426, the span(w) can be updated by increasing its value by the number of words contained in the candidate keyword c, and the freq(w) can be updated by increasing its value by 1.

From operation 426, the routine 400B proceeds to operation 428, where it is determined whether there are more words contained in the candidate keyword c that have not been processed. If so, the routine 400B proceeds to operation 424 to evaluate the next unprocessed word; otherwise, the routine 400B proceeds to operation 430. At operation 430, it is determined whether all of the candidate keywords have been evaluated or processed. If not, the routine 400B proceeds to operation 422 to examine the next candidate keyword; otherwise, the routine 400B proceeds to operation 432, where the candidate keywords are processed for a second round.

Specifically, a candidate keyword c is accessed in operation 432 and the keyword score for the candidate keyword c is set to 0. A word w in the candidate keyword c is then accessed in operation 434. In operation 436, the keyword score for the candidate keyword c is updated by increasing its value by an amount of span(w)/freq(w). The routine 400B then proceeds to operation 438, where it is determined whether there are more words contained in the candidate keyword c that have not been visited. If so, the routine 400B proceeds to operation 434 to access the next word; otherwise, the routine 400B proceeds to operation 440, where it is determined whether all of the candidate keywords have been visited. If not, the routine 400B proceeds to operation 432 to examine the next candidate keyword; otherwise, the routine 400B proceeds to operation 442, where it ends.

Table 2 shows pseudocode for an algorithm that can be utilized to implement the keyword extraction process discussed above with regard to FIGS. 3 and 4B.

TABLE 2

Algorithm 1 Keyword Extraction with Splitting Terms

```
Require: document d, a set of splitting terms S, number of keywords k
Ensure: k keywords
 1:  Obtain a set of candidate keywords C by splitting d with S
 2:  for each candidate c in C do
 3:      for each word w in c do
 4:          if span(w) and freq(w) are undefined then
 5:              span(w) := 0
 6:              freq(w) := 0
 7:          end if
 8:          span(w) += |c|         // |c| is the number of words in c
 9:          freq(w) += 1
10:      end for
11:  end for
12:  for each candidate c in C do
13:      score(c) := 0
14:      for each word w in c do
15:          score(c) += span(w) / freq(w)
16:      end for
17:  end for
18:  return top k candidate keywords with highest scores
```

It should be appreciated that at operation 308 of the routine 300 shown in FIG. 3, either the routine 400A shown in FIG. 4A or the routine 400B shown in FIG. 4B can be utilized to calculate the keyword scores for the candidate keywords. Generally speaking, the routine 400A requires less memory space but higher computational complexity than the routine 400B. As such, in scenarios where the memory space is very limited, the routine 400A is preferred over routine 400B. On the other hand, when the computational resources, such as CPU time, are limited, the routine 400B can be utilized to calculate the keyword score. The operation 308 can thus include a mechanism to choose a suitable method from the routine 400A and 400B to determine the keyword score of the candidate keywords based on the resource constraints.

As briefly discussed above, the keyword extraction technologies presented herein impose no restrictions on the length of the keywords 108 extracted from the document 118. In fact, the disclosed process inherently prefers a longer keyword through the way the keyword score is calculated. As a result, theoretically, the extracted keywords 108 can be of any length. In a well formatted and proper written document, the extracted keywords 108 generally have a reasonable length and there is no need to control the length of the keywords 108. However, some documents 118, such as a customer review, can be written by a user without proper formatting or grammar checking. These kinds of documents 118 can lead to extremely long keywords being extracted, and a length control mechanism can be implemented to limit the length of the extracted keywords 108 at a reasonable length.

In one configuration, the keyword extraction module 104 can be configured to set an upper limit on the acceptable length of the extracted keywords 108, such as five words. Those keywords that are longer than the upper limit would be removed from the extracted keywords 108. Alternatively, a more complicated algorithm can be implemented to limit the length of the extracted keywords 108. For instance, the keyword extraction module 104 can examine the candidate keywords 132 to determine how many times each candidate keyword appears in a collection of related documents. Those candidate keywords 132 that appear in more than a predetermined number of the documents would be included as the extracted keywords 108. Because it is unlikely for a very long candidate keyword to appear in the document often, this mechanism can in effect limit the length of the extracted keywords 108.

It should be further appreciated that the keyword extraction mechanism presented above in FIGS. 3 and 4 does not require information from outside the document. As such, a single document input is sufficient enough for effective keyword extraction. This feature not only allows the extraction process run faster and use less computing resources, it also make it possible to extract keywords from a document where the document is the only available input for the keyword extraction. In certain scenarios, in addition to the input document 118 itself, there can be other documents or information available that are related to the input document 118 in terms of their content. These documents or information can be utilized to enhance the keyword extraction results, especially when the computing resources are not limited and high accuracy in keyword extraction is preferred.

For instance, if a collection of documents that are related to the input document 118 is available, corpus level statistics can be calculated and utilized to enhance the keyword extraction. In an example where the input document 118 is a customer review of a certain camera, the customer reviews of all the cameras can be analyzed, e.g. through calculating TF-IDF type scores, to identify words that are common for all the camera products. These words can then be utilized to filter the extracted keywords to remove the common words and only present the keywords that are predominant for this particular camera.

Likewise, when additional information for an item that is discussed in the document is available, such information can also be utilized to improve the keyword extraction results. For example, item catalog data 204 of a certain item can be utilized to filter the keywords 108 extracted from a customer review of the item. Those keywords that are not mentioned in, or do not bear similarity to the item catalog data 204, can be filtered out, and the remaining keywords can be presented as the refined keywords.

The extracted keywords 108 can also be filtered or refined using describing words contained in the keywords themselves. In some scenarios, such as refining search results or guided search as discussed above, customers are mostly interested in topics that are described by a positive adjective, such as "good quality," "great display". In these cases, the extracted keywords 108 can be filtered to include only those headed by a set of pre-defined adjectives, such as "simple," "great," "amazing," "awesome," or "fantastic."

More advanced analysis, such as sentiment analysis, can also be employed to filter the extracted keywords 108 to identify those keywords that contain the desired sentiment. While the sentiment analysis can be computationally more expensive than using the describing words, it can lead to better results in capturing the sentiment of the keywords. For example, for the sentence "The lens of this camera is great," using describing words cannot capture the fact that "great" is used to describe the lens, whereas using the sentiment analysis can identify that the keyword "lens" extracted from this sentence has a positive sentiment and should be included in the extracted keywords 108.

It should be appreciated that the enhancements on the keyword extraction results described above are provided by way of illustration only and should not be construed as limiting. Various other mechanisms for improving the keyword extraction can also be utilized.

Figure 5:
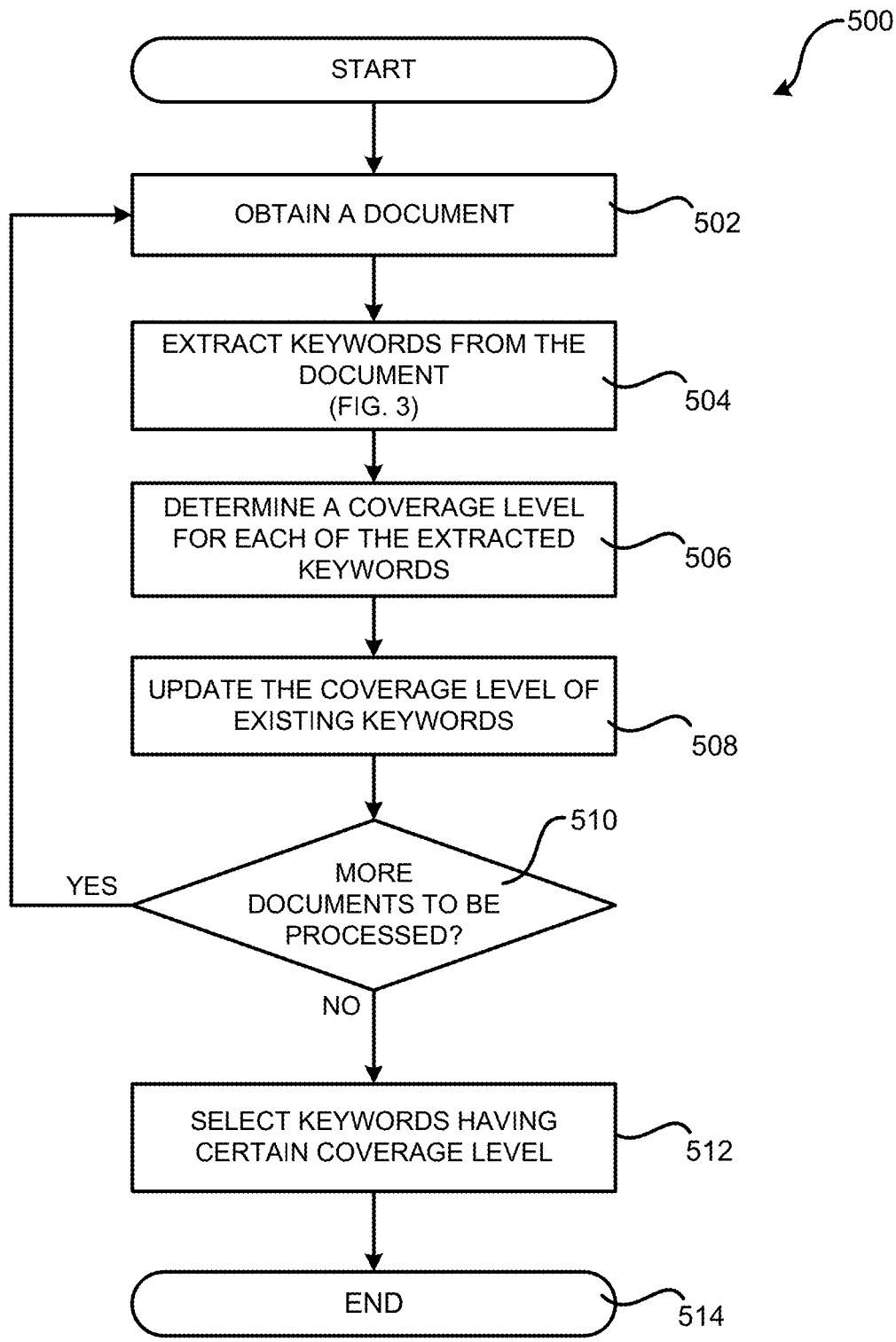
FIG. 5 is a flow diagram showing a routine that illustrates a method of extracting keywords from multiple documents, according to one configuration disclosed herein.

FIG. 5 is a flow diagram showing a routine 500 that illustrates aspects of a method of extracting keywords from multiple documents, according to one configuration disclosed herein. As discussed above, the keyword extraction process described above with regard to FIGS. 3 and 4 can extract keywords from a single document. There are situations, however, where keywords need to be extracted from a collection of documents. For example, an item, such as a certain camera, can have one-hundred customer reviews. It is sometime more interesting to extract keywords from the one-hundred customer reviews than from each individual customer review.

One way to extract the keywords from the collection of documents is to treat the collection of documents as a single document and perform the keyword extraction process presented in FIGS. 3 and 4. However, the collection of documents might be dynamic in that new documents can be generated and added to the collection of documents from time to time. For example, more and more new customer reviews for the camera can be submitted by customers. As a result, it can be inefficient to perform the keyword extraction on the entire collection the documents. FIG. 5 illustrates a method for efficiently extracting keywords from a dynamic collection of documents.

The routine 500 begins at operation 502, where the keyword extraction module 104 obtains an input document 118 from the collection of the documents. The input document 118 can be a new document recently added to the collection of documents. The routine 500 then proceeds to operation 504, where the keyword extraction module 104 can extract keywords 108 from the input document 118 using the method described above with regard to FIGS. 3 and 4.

From operation 504, the routine 500 proceeds to operation 506, where a coverage level for each of the extracted keywords 108 is determined. The coverage level reflects the importance of the keyword to the collection of document. In one implementation, it can be measured as the number of documents in which the keyword appears. The routine 500 then proceeds to operation 508, where the coverage level of existing keywords, i.e. the keywords that have been extracted from other documents in the collection, are updated.

From operation 508, the routine 500 proceeds to operation 510, where the keyword extraction module 104 determines whether there are additional documents that need to be processed. If so, the routine 500 returns to operation 502, where operations 502-510 are repeated for the next unprocessed document; otherwise, the routine 500 proceeds to operation 512, where the keywords are selected based on their coverage levels. Those keywords having a coverage level higher than a threshold or that are among the top keywords are selected as the keywords for the collection of documents.

From operation 512, the routine 500 proceeds to operation 514, where it ends. The routine 500 can be performed whenever a new document is added to the collection of documents, and the newly selected keywords at operation 512 will be used as the current keywords for the collection of documents.

Figure 6A:

FIG. 6A shows an illustrative user interface ("UI") 600A that can be presented to a customer 124 at a user computing device 122 containing search result refinement based on extracted keywords 108 from customer reviews of products, according to one embodiment. In one implementation, the UI 600A is sent by the online shopping module 202 as a Web page 116 to be rendered in a window 602 by the client application executing on the user computing device 122, as described above in regard to FIG. 2.

It should be noted that the user interface presented herein improves the ability of the computer to display information and interact with the user through the use of keyword extraction. This application solves problems of prior graphical user interfaces in the context of content browsing and searching (e.g., in an e-Commerce environment) relating to speed, accuracy, usability, and eliminating any doubts an online customer may have about purchasing a product online, e.g., through use of keywords extracted from customer reviews. According to one implementation, the graphical user interface presents a search result section detailing items contained in a search result adjacent a keyword section detailing keywords extracted from customer reviews of the items in the search result. This particular arrangement and combination of sections allows users to more efficiently and accurately make a purchasing decision when contemplating making an online purchase/rental/acquisition of an item. As such, the UI improves the ability of the computer to display information and interact with the user.

The UI 600A includes search results 614 generated by the online shopping module 212 in response to the customer 124 issuing a search query containing search terms input through a text field 604. In the example shown in FIG. 6A, the window 602 presents a list of search results 614 for the search query "tablet." Each item in the search results 614 includes a short description 610 of the corresponding item. The items in the search results 614 can also have one or more customer reviews and/or ratings 616 associated therewith.

The search results 614 can be refined by utilizing various filters presented in the filter panel 606. For example, the search results 614 can be refined or filtered by the brand, the price, or the operating system of the tablet products as shown in FIG. 6A. In addition, the search results 614 can be refined using the keywords 108 extracted from the customer reviews of the items in the search results 614, as shown in the filter 612. Because the keywords 108 are extracted from customer reviews, rather than the item description provided by the seller or the manufacturer of the items, the extracted keywords 108 can include information that is otherwise unavailable in the item description 610 but that can be useful in helping a customer 124 to make a purchase decision.

It can be seen from FIG. 6A that the space in the filter panel 606 is very limited. As such, only a limited number of keywords 108 can be displayed in the filter panel 606. The search results 614, on the other hand, can include thousands or even tens of thousands of items, which leads to a large number of possible keywords to be used in the filter panel 606. It is thus a non-trivial technical task to select the keywords 108 for display in the filter panel 606.

According to one configuration, the online shopping module 202, or any other module responsible for generating the network page 116 can estimate the available space for displaying the keyword filter 612 in the filter panel 606. The estimation can be made based on the intended display size of the filter panel 606, the existing filters in the filter panel 606, the importance of the keyword filter relative to other filters, and the like. Based on the estimated available space, the online shopping module can determine a set of constraints on the keywords to be displayed in the filter panel 606, such as the maximum number of the keywords to be displayed, and the maximum length of each of these keywords.

Given these constraints, the online shopping module 202 can select keywords from the available keywords, i.e. the keywords extracted from the customer reviews of the search results 614, to meet the display constraints. In one configuration, the online shopping module 202 can select those keywords that are no longer than a certain number of words, while providing the highest coverage of the search results 614. For example, the online shopping module 202 can select keywords with a length no higher than four words, and with the top coverage level of the search results 614. The coverage level of a keyword can be measured by the number of items in the search results 614 whose customer reviews contain the keyword. According to further configurations, the online shopping module 202 can further limit the displayed keywords to contain positive words, such as "great quality," "good for kids," and the like. The online shopping module 202 can then insert the keywords to be displayed into the Web page 602 by utilizing proper user interface controls.

As shown in FIG. 6A, a checkbox 618A-618C can be displayed next to each of the displayed keywords 108. Selection of one of the checkboxes 618A-618C will cause the corresponding keyword 108 to be selected as a filter to remove results from the search results 614 for those items that do not contain the selected keyword in their associated data, such as customer reviews or item information. In one implementation, the filtering can be achieved by performing a search for the selected keywords in data associated with the items in the search results 614 and those items containing the selected keywords will be displayed as the filtered search results. In another implementation, the selected keywords can be used as indexes to identify the documents or customer reviews that contain the selected keywords. The identified customer reviews can then be utilized to identify their corresponding items which would be included in the filtered search results.

In order for the keyword filters to be effective, the keywords 108 extracted from the customer reviews of items offered for sale by the online shopping module 202 should be updated so that the keywords reflect the latest information. According to one configuration, the keyword extraction module 104 can perform keyword extraction on the customer review data 206 periodically, such as every day, week or month. For items that constantly receive new customer reviews, the keyword extraction module 104 can extract keywords every day; and for those items for which new customer reviews are received less often, the keyword extraction can be performed once a week or even once a month.

As shown in FIG. 6A, the filter 612 can also be configured to include a user interface control 628, such as a slider, to allow a user to set the maximum number of words contained in a keyword shown in the filter 612. For example, if the user limits the maximum number of words in a keyword to be 3, the displayed keywords corresponding to the checkboxes 618A-618C can be dynamically changed to contain only keywords with 3 or fewer words.

It should be understood that the filter 612 can be further configured to provide functionality that allows customers 124 to remove certain words from the displayed keywords when applying the filter. For example, the keywords can be displayed using user interface controls (not shown), such as buttons, one for each of the words contained in a keyword. Selection of the user interface control can cause the corresponding word to be included or excluded from the keyword used in the filtering. In the example shown in FIG. 6A, the customer 124 can remove "good" from the "good sound quality" keyword. In response to the removal, the online shopping module 202 can perform a search in the search results 614 to identify items whose customer reviews or item information contain the term "sound quality." The identified items can be presented as the filtered search results in the window 602. In some implementations, the UI 600A can further contain a user interface control 622 that allows the customer 124 to view more keywords for use in a filter.

It should also be understood that a user's preference on the displayed keywords can also be collected implicitly from the UI 600A. For example, the user might, by manipulating a user input device, such as a mouse, click on or hover over certain keywords in the displayed keywords more often than other keywords. In this case, it can be determined that the user might prefer to see those keywords, but not other keywords. For instance, a user might click on the keyword "good sound quality" more often than clicking on other keywords. This implicit feedback can be recorded and utilized to increase the score for the keyword "good sound quality" so that it is among the top keywords shown to a user.

FIG. 6B shows an illustrative UI 600B that can be presented to a customer 124 at a user computing device 122 containing an item comparison table based on extracted keywords 108 from customer reviews of items, according to one embodiment. In one implementation, the UI 600B can be sent by the online shopping module 202 as a Web page 116 to be rendered by the client application executing on the user computing device 122, as described above in regard to FIG. 2.

The UI 600B includes items 634A-634D that are to be compared with each other. The comparison can be made based on the features of the items, such as the price 626 and the specifications 638 of the items. For a laptop item, the specification can include the weight 638A, processor speed 638B, memory size 638C and storage size 638D. The comparison can also be made based on ratings 640 provided by customers of the items. The keywords 108 extracted from the customer reviews of these items can also be included in the comparison table under the "customer reviews say" section 632 to facilitate a customer in comparing the items. Additional details regarding generating and presenting the comparison table is described in U.S. patent application Ser. No. 14/949,718, which was filed on Nov. 23, 2015, and entitled "System for Generating Output Comparing Attributes of Items," and which is expressly incorporated herein by reference in its entirety.

Figure 7:
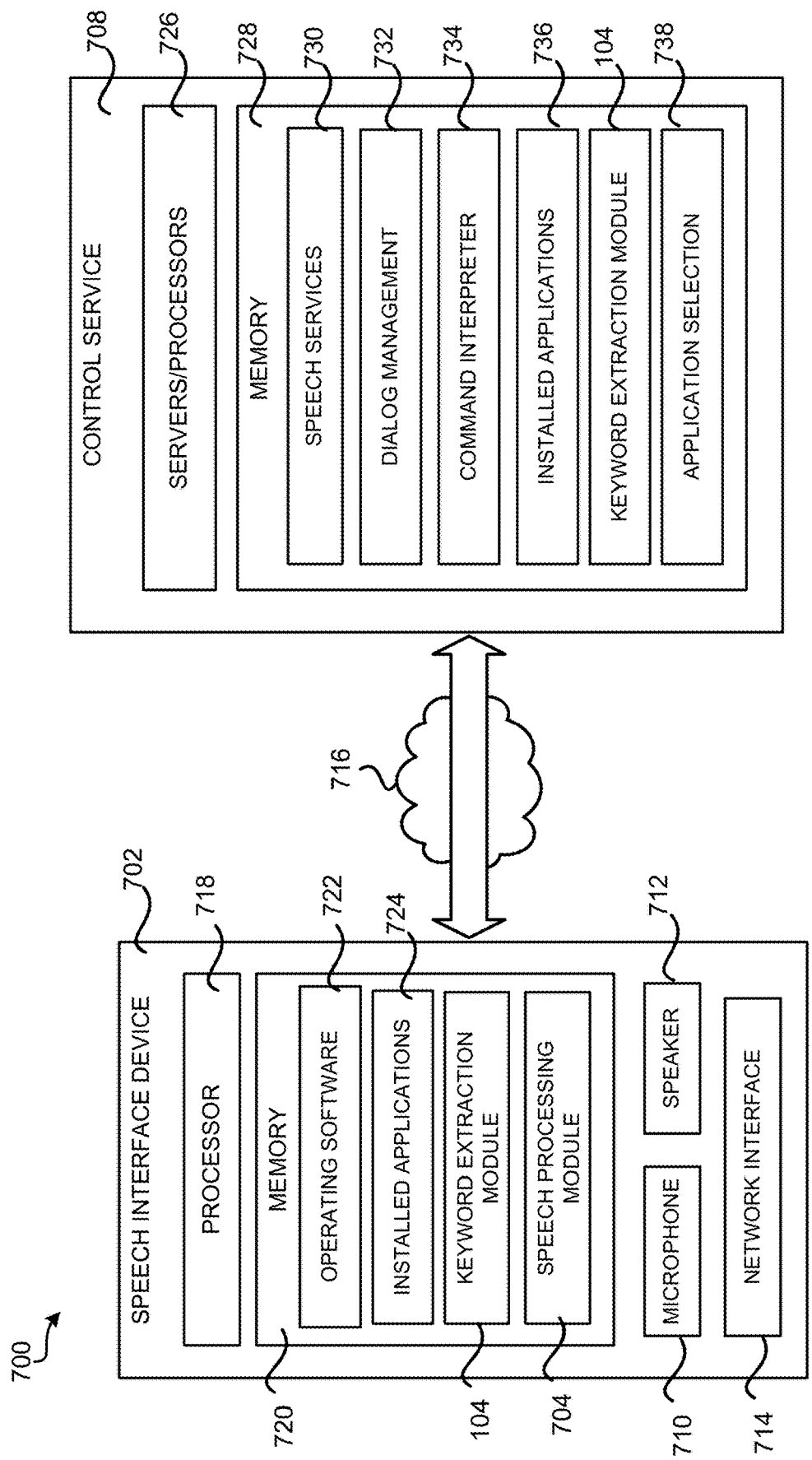
FIG. 7 is a system architecture diagram showing aspects of a voice-based system configured to extract keywords from recorded speech signals, according to one configuration disclosed herein.

FIG. 7 is a system architecture diagram showing aspects of a voice-based platform or system 700 configured to extract keywords from recorded speech signals, according to one configuration disclosed herein. The system 700 can include a speech interface device 702 that is capable of capturing and playing audio. The speech interface device 702 can be a personal computer ("PC"), a desktop workstation, a laptop, a notebook, a personal digital assistant ("PDA"), an electronic-book reader, a smartphone, a wearable computing device (such as a smart watch, a smart glass, a virtual reality head-mounted display), a voice command device (such as a smart voice-enabled wireless speaker), a game console, a set-top box, a consumer electronics device, a server computer, or any other computing device capable of recording, processing and playing back audio signals.

As shown in FIG. 7, the speech interface device 702 can have an audio recording unit, such as one or more microphones 710, and an audio output unit, such as one or more audio speakers or transducers 712, to facilitate speech interactions with a user of the speech interface device 702. The speech interface device 702 can also include a processor 718 and memory 720. Applications, programs and other software can be stored in the memory 720 for execution by the processor 718. The software can include system or operating software 722 that is preinstalled on and integrated with the speech interface device 702. The memory 720 can also contain other applications such as user-installed applications 724 that have been installed by a user of the speech interface device 702.

The speech interface device 702 can have a network communications interface 714 for communications over a communications network 716 with a control service 708 that is configured to receive audio from the speech interface device 702, to recognize speech in the received audio, and to perform or initiate functions or services in response to the recognized speech. The control service 708 can be configured to provide services to large numbers of speech interface devices 702 owned by different users.

Specifically, the control service 708 can be configured to receive an audio stream from the speech interface device 702, to recognize speech in the audio stream, and to determine user intent from the recognized speech. Depending on the nature of the recognized intent, the control service 708 can respond by performing an action or invoking an application to perform an action. In some cases, the control service 708 can determine the intent and return a description of the intent to the speech interface device 702 so that the speech interface device 702 can perform an action in response to the intent. Upon receiving a recognized intent from the control service 708, the speech interface device 702 can invoke one of the user-installed applications 724 to perform an action in fulfillment of the intent.

The control service 708 can include one or more servers, computers, and/or processors 726. The memory 728 of the control service 708 can contain applications, programs, and/or other software, which can include speech services 730. The speech services 730 can include automatic speech recognition (ASR) functionality that recognizes human speech in an audio signal provided by the speech interface device 702 from the microphone 710. The speech services 730 can also include natural language understanding (NLU) functionality that determines user intent based on user speech that is recognized by the speech recognition components. The speech services 730 can also include speech generation functionality that synthesizes or otherwise produces speech audio. For example, the speech generation functionality can comprise a text-to-speech component that produces speech to be played on the speaker 712 of the speech interface device 702.

The control service 708 can also provide a dialog management component 732 configured to coordinate speech dialogs or interactions with the user of the speech interface device 702 in conjunction with the speech services 730. Speech dialogs can be used to determine or clarify user intents by asking the user for information using speech prompts. The control service 708 can also comprise a command interpreter and action dispatcher 734 (referred to below simply as a command interpreter 734) that determines functions or commands corresponding to intents expressed by user speech.

The control service 708 can also be configured to use one or more user-installed applications 736. The control service 708 can also have an application selection component 738 that selects and invokes applications based on recognized intents expressed by user speech. Additional details regarding the voice-based platform 700 is described in U.S. patent application Ser. No. 14/107,931 filed on Dec. 16, 2013, and entitled "Attribute-based Audio Channel Arbitration," and in U.S. patent application Ser. No. 14/456,620 filed on Aug. 11, 2014, and entitled "Voice Application Architecture," both of which are expressly incorporated herein by reference in its entirety.

In one configuration, the control service 708 can also be configured with a keyword extraction module 104 as described above with regard to FIGS. 1 and 2. The keyword extraction module 104 can extract keywords 108 from text converted from speech signals sent from the speech interface device 702. For example, the speech interface device 702 can record speech signals from its surroundings, such as the audio part of a TV program played from a TV set nearby, a conversation or a phone call occurred in the room where the speech interface device 700 is located. The recorded speech signals can be sent to the control service 708, and be converted into text by the speech services 730. The keyword extraction module 104 can then extract keywords 108 from the text in a way similar to that described above with regard to FIGS. 1-5. The control service 708 can then utilize the speech services 730 to convert the extracted keywords 108 into speech signals that are to be played on the speaker 712 of the speech interface device 702. By utilizing the system 700 presented in FIG. 7, a user can record events occurred in the room, such as news broadcast through the TV set, meeting discussion held in the room, or any conversation occurred there. The user can later quickly capture the content of the recording without listening to the entire recording of the news, discussion, or conversation.

It should be appreciated that because the keyword extraction mechanism presented herein is highly computationally efficient, the keyword extraction module 104 can be implemented in a user computing device, such as the speech interface device 702, that has very limited computing resources and a minimal user interface, such as a microphone and a speaker. As shown in FIG. 7, the speech interface device 702 can be configured with a keyword extraction module 104 and a speech processing module 704. The speech processing module 704 can be configured to convert the recorded speech signals into text, from which the keyword extraction module 104 can extract keywords 108 in a way similar to that described above with regard to FIGS. 1-5. The speech processing module 704 can then convert the keywords into speech signals to be played on the speaker 712. In this way, the keyword extraction from the recorded speech can be achieved with little or no involvement from the control service 708.

It should be further appreciated that the extracted keywords 108 can be stored on the speech interface device 702 or the control service 708 as a summary of the speech signal. This eliminates the need of storing the entire speech signal, thereby reducing the storage consumption on the speech interface device or the control service 708, and also reducing the user's privacy concern associated with storing the entire speech signal.

Figure 8:
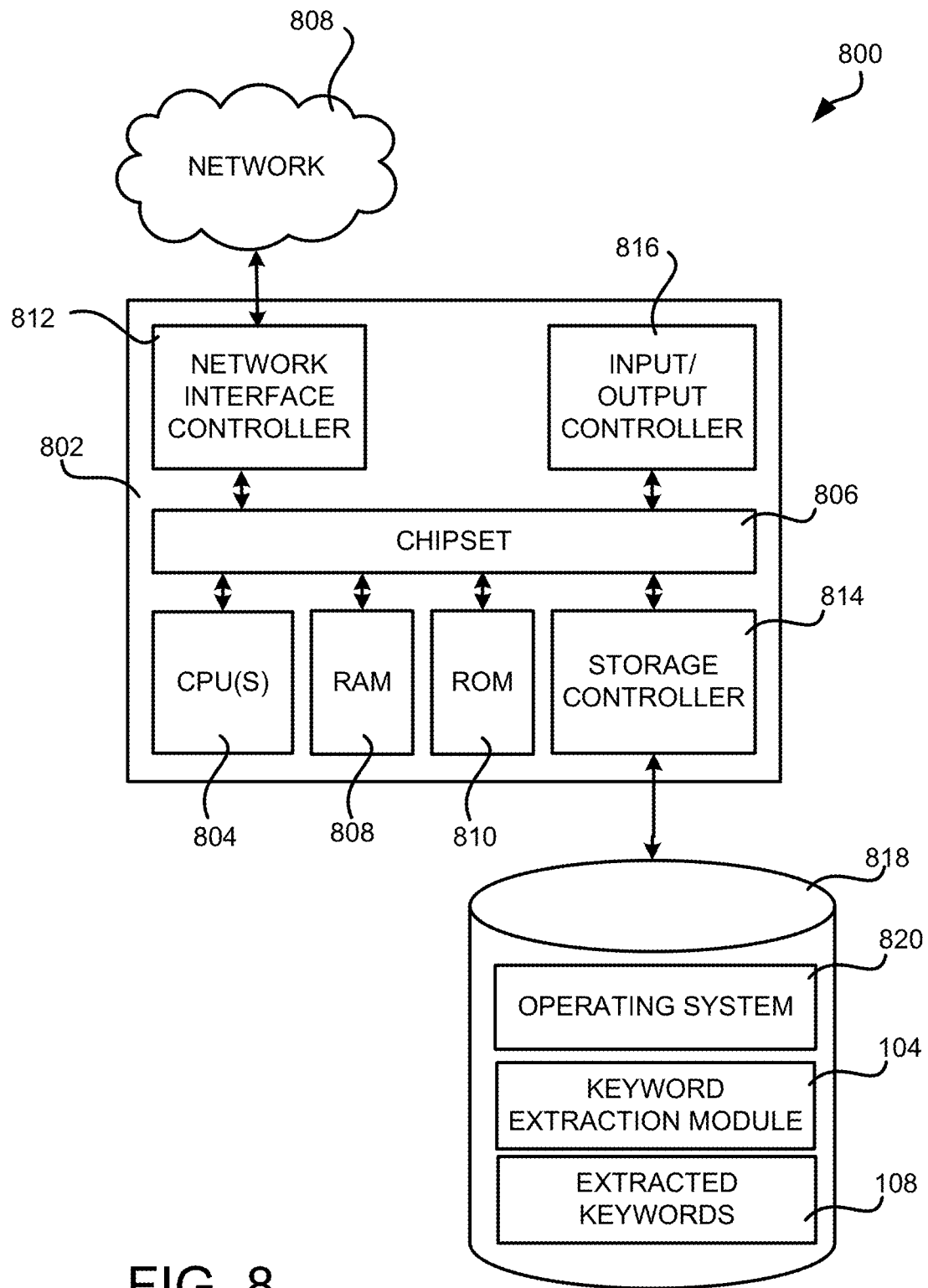
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, keyword extraction module 104, and extracted keywords 108, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 818 can store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-7. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, a plotter, or other type of output device. It will be appreciated that the computer 800 might not include all of the components shown in FIG. 8, can include other components that are not explicitly shown in FIG. 8, or might utilize an architecture completely different than that shown in FIG. 8.

Embodiments of the disclosure can be described in view of the following clauses:

Clause 1: A non-transitory computer-readable storage media having instructions stored thereupon that are executable by one or more processors and which, when executed, cause the one or more processors to: receive a document; obtain splitting terms for the document, the splitting terms comprising one or more of function words, punctuation, or formatting, generate a plurality of candidate keywords for the document based on the splitting terms; determine a keyword score for individual ones of the plurality of candidate keywords by determining a word score for one or more words contained in individual candidate keywords, the word score for a word being determined by measuring a span of candidate keywords containing the word and a frequency of the word appearing in the candidate keywords; select, from the plurality of candidate keywords, one or more keywords based on the keyword score; and cause at least one of the one or more keywords to be incorporated into a network page.

Clause 2: The non-transitory computer-readable storage media of clause 1, wherein the word score is proportional to the span of the candidate keywords containing the word and is inversely proportional to the frequency of the word appearing in the candidate keywords.

Clause 3: The non-transitory computer-readable storage media of clauses 1-2, wherein the document comprises a customer review of an item presented in the network page.

Clause 4: The non-transitory computer-readable storage media of clauses 1-3, wherein the network page comprises a search result listing a plurality of items satisfying a search query, and wherein the at least one keyword is incorporated into the network page by adding to the network page at least one user interface control representing the at least one keyword which, when selected, causes the search result be filtered to include items that contain a keyword corresponding to the selected user interface control.

Clause 5: The non-transitory computer-readable storage media of clauses 1-4, wherein adding the at least one user interface control on the network page comprises: determining an available space on the network page; determining a number limit and a length limit of keywords to be presented in the network page based on the available space; selecting at least one keyword from the one or more keywords that satisfies the number limit and the length limit of keywords; and inserting the user interface control representing the at least one keyword into the network page.

Clause 6: The non-transitory computer-readable storage media of clauses 1-5, wherein the function words are obtained by accessing a pre-determined set of function words or by performing a statistical analysis on a collection of documents that are related to the document.

Clause 7: A computer-implemented method for extracting keywords from a document, the method comprising: extracting a plurality of candidate keywords from a document based on splitting terms for the document; determining a keyword score for individual ones of the plurality of candidate keywords by determining a word score for one or more words contained in individual candidate keywords; selecting, from the plurality of candidate keywords, one or more keywords based on the keyword score; and causing the one or more keywords to be stored in a data store.

Clause 8: The computer-implemented method of clause 7, wherein determining the word score for a word comprises: measuring a span of candidate keywords that contain the word; measuring a frequency of the word appearing in the candidate keywords; and generating the word score to be proportional to the span of the candidate keywords and inversely proportional to the frequency of the word, and wherein the keyword score for a candidate keyword is calculated as a sum of word scores for words contained in the candidate keyword.

Clause 9: The computer-implemented method of clauses 7-8, wherein the splitting terms comprise one or more of function words, punctuation, or formatting, and wherein the candidate keywords are extracted as words or phrases located between two adjacent splitting terms in the document.

Clause 10: The computer-implemented method of clauses 7-9, further comprising causing at least one of the one or more keywords to be incorporated into a network page, wherein the document comprises a customer review for an item presented in the network page.

Clause 11: The computer-implemented method of clauses 7-10, wherein the network page comprises a description of the item, and wherein incorporating the one or more keywords into the network page comprises adding the one or more keywords into the description of the item.

Clause 12: The computer-implemented method of clauses 7-11, wherein the network page comprises a search result listing a plurality of items satisfying a search query, and wherein incorporating the one or more keywords into the network page comprises adding into the network page one or more user interface controls representing the one or more keywords which, when selected, causes the search result be filtered to include items that contain a keyword corresponding to the selected user interface control.

Clause 13: The computer-implemented method of clauses 7-12, wherein the network page comprises a user interface control allowing a user to input a search query, and wherein incorporating the one or more keywords into the network page comprises providing a suggested term to be included in the search query based on the one or more keywords.

Clause 14: The computer-implemented method of clauses 7-13, wherein incorporating the one or more keywords into the network page comprises adding the one or more keywords as search tags of the network page that are searchable by a search engine.

Clause 15: An apparatus, comprising: one or more processor; and one or more non-transitory computer-readable storage media having instructions stored thereupon which are executable by the one or more processors and which, when executed, cause the apparatus to: receive a document, extract a plurality of candidate keywords from the document, determine a keyword score for individual ones of the plurality of candidate keywords by determining a word score for one or more words contained in the individual candidate keywords, select, from the plurality of candidate keywords, one or more keywords based on the keyword score, and cause the one or more keywords to be stored in a data store.

Clause 16: The apparatus of clause 15, wherein determining the word score for a word comprises: measuring a span of candidate keywords that contain the word; measuring a frequency of the word appearing in the candidate keywords; and generating the word score to be proportional to the span of the candidate keywords and inversely proportional to the frequency of the word, and wherein the keyword score for a candidate keyword is calculated as a sum of word scores for words contained in the candidate keyword.

Clause 17: The apparatus of clauses 15-16, wherein the non-transitory computer-readable storage media having further instructions to cause at least one of the one or more keywords to be incorporated into a network page, and wherein the network page comprises a description of an item and the document comprises a customer review of the item.

Clause 18: The apparatus of clauses 15-17, wherein incorporating the one or more keywords into the network page comprises adding the one or more keywords into the description of the item.

Clause 19: The apparatus of clauses 15-18, further comprising an audio recording unit configured to record speech signals from surroundings of the apparatus and a speech processing module configured to convert speech signals into text, wherein the document is generated by the speech processing module converting a speech signal recorded by the audio recording module.

Clause 20: The apparatus of clause 15-19, further comprising an audio output unit for playing back speech signals, wherein the speech processing module is further configured to convert the one or more keywords into a speech signal to be played back by the audio output unit.

Based on the foregoing, it should be appreciated that technologies for extracting keywords from a document have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A non-transitory computer-readable storage media having instructions stored thereupon that are executable by one or more processors and which, when executed, cause the one or more processors to:
    determine splitting terms for a document;
    generate one or more candidate keywords for the document based on the determined splitting terms;
    determine a keyword score for individual ones of the one or more candidate keywords;
    select, from the one or more candidate keywords, one or more keywords based on the keyword score; and
    add at least one user interface control representing the one or more keywords to a network page by:
        receiving, from a user device, a length limit of keywords to be presented in the network page;
        selecting at least one keyword from the one or more keywords that satisfies the length limit of keywords; and
        inserting the at least one user interface control representing the at least one keyword into the network page.

2. The non-transitory computer-readable storage media of claim 1, wherein the receiving the length limit of keywords comprises:
    adding, to the network page, at least one additional user interface control configured to allow a user to select the length limit of keywords; and
    receiving the length limit of keywords to be presented in the network page based on a user interaction with the at least one additional user interface control.

3. The non-transitory computer-readable storage media of claim 2, wherein the at least one additional user interface control is a slider configured to allow the user to dynamically select the length limit of keywords to be presented in the network page by interacting with the at least one additional user interface control to move the slider to a selected length limit; and
    the dynamic selection of a second length limit of keywords to be presented causes the network page to be updated to present one or more second keywords that satisfy the second length limit of keywords.

4. The non-transitory computer-readable storage media of claim 1, wherein:
    the document comprises a customer review of an item presented in the network page; and
    the network page comprises a search result listing a plurality of items satisfying a search query, and wherein the at least one user interface control represents the at least one keyword and, when a particular user interface control of the at least one user interface control is selected, the search result is filtered to include items that contain a keyword corresponding to the particular user interface control.

5. The non-transitory computer-readable storage media of claim 4, wherein adding the at least one user interface control on the network page further comprises:
    determining an available space on the network page; and
    determining a number limit of keywords to be presented in the network page based on the available space and wherein the selecting the at least one keyword further satisfies the number limit of keywords.

6. The non-transitory computer-readable storage media of claim 1, wherein the splitting terms comprise one or more of function words, punctuation, or formatting;
    respective ones of the one or more candidate keywords comprise one or more words or phrases located between two adjacent splitting terms of the splitting terms; and
    the determining the keyword score for the individual ones of the one or more candidate keywords is performed by determining a word score for one or more words contained in individual candidate keywords and comprises:
        determining word scores for one or more words contained in individual candidate keywords, the word score for a word being determined by measuring a span of candidate keywords containing the word and measuring a frequency of the word appearing in the candidate keywords between the two of the adjacent splitting terms, the word score being proportional to the span of the candidate keywords and inversely proportional to the frequency of the word; and
        determining a sum of the word scores corresponding to the one or more words contained in the individual candidate keywords.

7. A computer-implemented method comprising:
    determining splitting terms for a document;
    extracting one or more candidate keywords from the document based on the determined splitting terms;
    determining word scores for one or more words contained in individual candidate keywords of the one or more candidate keywords;
    determining a keyword score for individual ones of the one or more candidate keywords by determining a word score for one or more words contained in individual candidate keywords;
    selecting, from the one or more candidate keywords, one or more keywords based on the keyword score;
    causing the one or more keywords to be stored in a data store; and
    adding at least one user interface control representing the one or more keywords to a network page by:
        receiving, from a user device, a length limit of keywords to be presented in the network page;
        selecting at least one keyword from the one or more keywords that satisfies the length limit of keywords; and
        inserting the at least one user interface control representing the at least one keyword into the network page.

8. The computer-implemented method of claim 7, wherein the determining the word score for a word comprises:
   measuring a span of candidate keywords that contain the word;
   measuring a frequency of the word appearing in the span of candidate keywords; and
   generating the word score to be proportional to the span of the candidate keywords and inversely proportional to the frequency of the word,
   wherein the keyword score for a candidate keyword is calculated as a sum of word scores for words contained in the candidate keyword.

9. The computer-implemented method of claim 7, wherein the splitting terms comprise one or more of function words, punctuation, or formatting, and wherein the candidate keywords are extracted as words or phrases located between two adjacent splitting terms in the document.

10. The computer-implemented method of claim 7, wherein the receiving the length limit of keywords comprises:
   adding, to the network page, at least one additional user interface control configured to allow a user to specify the length limit of keywords; and
   receiving the length limit of keywords to be presented in the network page based on a user interaction with the at least one additional user interface control.

11. The computer-implemented method of claim 10, wherein the at least one additional user interface control is a slider configured to allow the user to dynamically select the length limit of keywords to be presented in the network page by interacting with the at least one additional user interface control to move the slider to a selected length limit; and
   a dynamic selection of a second length limit of keywords to be presented causes the network page to be updated to present one or more second keywords that satisfy the second length limit of keywords.

12. The computer-implemented method of claim 10, wherein:
   the document comprises a customer review for an item presented in the network page; and
   the network page comprises a search result listing a plurality of items satisfying a search query, and wherein the at least one user interface control represents the one or more keywords and, when a particular user interface control of the at least one user interface control is selected, the search result is filtered to include items that contain a keyword corresponding to the particular user interface control.

13. The computer-implemented method of claim 12, wherein the network page comprises a description of the item.

14. The computer-implemented method of claim 10, wherein the network page comprises a further user interface control allowing a user to input a search query.

15. An apparatus, comprising:
   one or more processor; and
   one or more non-transitory computer-readable storage media having instructions stored thereupon which are executable by the one or more processors and which, when executed, cause the apparatus to:
      determine splitting terms for a document;
      extract one or more candidate keywords from the document based on the determined splitting terms;
      determine word scores for one or more words contained in individual candidate keywords of the one or more candidate keywords;
      determine a keyword score for individual ones of the one or more candidate keywords by determining a word score for one or more words contained in the individual candidate keywords;
      select, from the one or more candidate keywords, one or more keywords based on the keyword score;
      cause the one or more keywords to be stored in a data store; and
      add at least one user interface control representing the one or more keywords to a network page by:
         receiving, from a user device, a length limit of keywords to be presented in the network page;
         selecting at least one keyword from the one or more keywords that satisfies the length limit of keywords; and
         inserting the user interface control representing the at least one keyword into the network page.

16. The apparatus of claim 15, wherein respective ones of the one or more candidate keywords comprise one or more words or phrases located between two adjacent splitting terms of the splitting terms and determining the word score for a word comprises:
   measuring a span of candidate keywords that contain the word;
   measuring a frequency of the word appearing in the span of candidate keywords; and
   generating the word score to be proportional to the span of the candidate keywords and inversely proportional to the frequency of the word,
   wherein the keyword score for a candidate keyword is calculated as a sum of word scores for words contained in the candidate keyword.

17. The apparatus of claim 15, wherein the network page comprises a description of an item and the document comprises a customer review of the item.

18. The apparatus of claim 15, wherein receiving the length limit of keywords comprises:
   adding, to the network page, at least one additional user interface control configured to allow a user to specify the length limit of keywords; and
   receiving the length limit of keywords to be presented in the network page based on a user interaction with the at least one additional user interface control.

19. The apparatus of claim 18, wherein the at least one additional user interface control is a slider configured to allow the user to dynamically select the length limit of keywords to be presented in the network page by interacting with the at least one additional user interface control to move the slider to a selected length limit; and
   a dynamic selection of a second length limit of keywords to be presented causes the network page to be updated to present one or more second keywords that satisfy the second length limit of keywords.

20. The apparatus of claim 18, wherein:
   the document comprises a customer review for an item presented in the network page; and
   the network page comprises a search result listing a plurality of items satisfying a search query, and wherein the at least one user interface control represent the one or more keywords and, when a particular user interface control of the at least one user interface control is selected, the search result is filtered to include items that contain a keyword corresponding to the particular user interface control.

* * * * *